(12) United States Patent
Dietrich

(10) Patent No.: US 9,313,257 B2
(45) Date of Patent: Apr. 12, 2016

(54) METHOD FOR STARTING A CLIENT PROGRAM

(75) Inventor: Frank Dietrich, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 48 days.

(21) Appl. No.: 14/351,176

(22) PCT Filed: Sep. 14, 2012

(86) PCT No.: PCT/EP2012/068124
§ 371 (c)(1),
(2), (4) Date: May 15, 2014

(87) PCT Pub. No.: WO2013/056922
PCT Pub. Date: Apr. 25, 2013

(65) Prior Publication Data
US 2014/0282994 A1    Sep. 18, 2014

(30) Foreign Application Priority Data
Oct. 18, 2011    (DE) .......................... 10 2011 084 728

(51) Int. Cl.
*G06F 15/16* (2006.01)
*H04L 29/08* (2006.01)
*G06F 21/34* (2013.01)
*G06F 21/42* (2013.01)
*H04L 29/06* (2006.01)

(52) U.S. Cl.
CPC ................ *H04L 67/02* (2013.01); *G06F 21/34* (2013.01); *G06F 21/42* (2013.01); *H04L 63/08* (2013.01); *H04L 67/42* (2013.01)

(58) Field of Classification Search
CPC .......... G06F 21/34; G06F 21/42; H04L 67/42; H04L 67/02
USPC ........................................................ 726/3, 9
See application file for complete search history.

(56) References Cited

U.S. PATENT DOCUMENTS

| | | | | |
|---|---|---|---|---|
| 8,584,224 | B1 * | 11/2013 | Pei et al. .......................... | 726/10 |
| 2001/0045451 | A1 * | 11/2001 | Tan et al. ....................... | 235/375 |
| 2004/0128247 | A1 * | 7/2004 | Sato et al. ...................... | 705/41 |
| 2007/0294431 | A1 * | 12/2007 | Adelman et al. .............. | 709/245 |

(Continued)

OTHER PUBLICATIONS

WIPO, International Preliminary Report on Patentability-English translation, PCT/EP2012/068124, May 1, 2014.

(Continued)

*Primary Examiner* — Baotran N To
(74) *Attorney, Agent, or Firm* — Leveque Intellectual Property Law, P.C.

(57) ABSTRACT

A method for calling up a client program: transmitting a message to a server computer system using an Internet browser, wherein the message contains at least one parameter for communication of the client program with the Internet browser; dynamically generating a URL by the server computer system, wherein the URL calls up the client program according to a URL scheme, wherein the URL contains the at least one parameter; transmitting a website having the URL from the server computer system to the user computer system and displaying the website having the URL in a browser window of the Internet browser for selection by a user; starting the client program on a user computer system and imputing the at least one parameter into the client program on the basis of the selection of URL by the user; and communicating a result.

30 Claims, 4 Drawing Sheets

(56) References Cited

U.S. PATENT DOCUMENTS

2011/0023103 A1* 1/2011 Dietrich et al. .................. 726/9
2011/0296512 A1* 12/2011 Dietrich et al. .................. 726/9

OTHER PUBLICATIONS

BSI: Technical Guideline eID-Server, BSI TR-03130-1, Version 2.0.1, Jan. 15, 2014 (English version of BSI: "Technische Richtlinie eID-Server", Bundesamt fur Sicherheit in Der Informationstechnik, Bonn, vol. BSI TR-30130, No. Version 1.2 RCI, Apr. 1, 2010, pp. 1-51, also attached).

BSI: Technical Guideline TR-03112-7 eCard-API-Framework-Protocols, Version 1.1.2 alpha, Oct. 6, 2011.

European Patent Office, International Search Report, PCT/EP2012/068124, Jul. 5, 2013.

* cited by examiner

METHOD FOR STARTING A CLIENT PROGRAM

PRIORITY CLAIM

This application claims benefit of foreign priority in accordance with 35 U.S.C. 119(b) to German application No. 10 2011 084 728.6 filed Oct. 18, 2011.

FIELD OF DISCLOSURE

The disclosure relates to a method for calling up a client program via an Internet browser of a user computer system, to a computer program product, a user computer system and a server computer system.

BACKGROUND

What are known as browser plug-ins are known per se from the prior art. Browser plug-ins provide an additional functionality on a user computer system, in particular a personal computer of a user. Examples for this include Adobe Reader plug-ins in order to display directly in the browser window PDF documents stored on websites, or plug-ins in order to allow the Bürgerclient ("AusweisApp") to communicate via the eCard-API Framework (BSI TR-03103-7) with the new electronic personal identity card and an eID provider.

A method for reading attributes from an ID token is known from DE 10 2008 000 067 and is implemented by the AusweisApp. A development of this method is known from DE 10 2010 028 133.6-31.

DESCRIPTION

Figure 1:
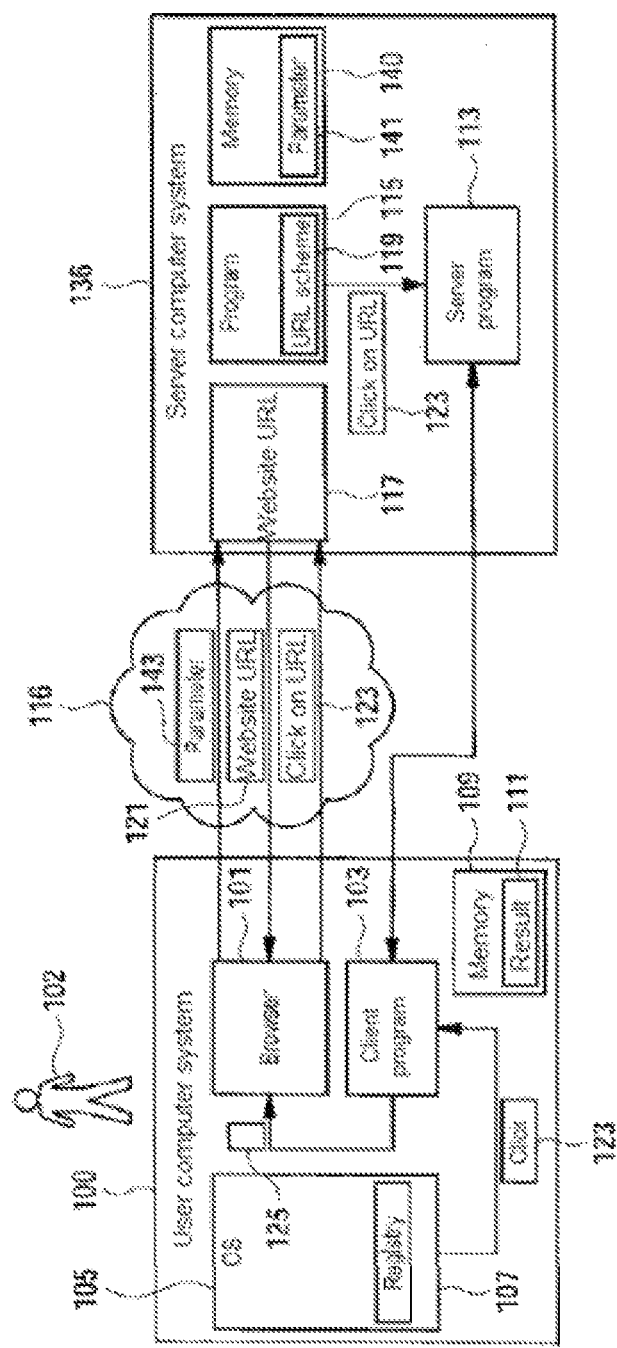
FIG. 1 shows a block diagram of an embodiment of a data processing system according to the disclosure.

By contrast, an object of the disclosure is to create a method for calling up a client program via an Internet browser and also to create a corresponding computer program product, a user computer system and a server computer system.

Each object forming the basis of the present disclosure is achieved by the features of the respective independent patent claims. Embodiments of the disclosure are specified in the dependent patent claims.

In accordance with embodiments of the disclosure an Internet browser is installed on a user computer system of a user. For example, the Internet browser may be Microsoft Internet Explorer, Safari, Google Chrome, Firefox or another conventional Internet browser program. In particular, the Internet browser may be a browser program which is suitable for execution on a mobile telephone, in particular what is known as a Smartphone, for example a web browser for Symbian Smartphones, or for Smartphones with the Apple operating system or Android operating system. In particular, the Internet browser may be a browser program which does not support any plug-ins or with which the user has blocked the execution of plug-ins by a corresponding user setting.

A client program is installed on the user computer system. By way of example, the user computer system has an operating system with what is known as a registry, in which both the client program and the Internet browser are registered, possibly in addition to further programs installed on the user computer system. If the client program and the Internet browser are started on the user computer system, the operating system of the user computer system thus ensures that these programs are executed in different process areas, as is the case for example with Windows, Apple, Linux, Symbian or Linux operating systems. In contrast to a browser plug-in, which runs in the same process area as the Internet browser, the Internet browser and the client program run in different process areas in accordance with embodiments of the disclosure.

Here, a "user computer system" is understood to be a computer system of a user, for example a personal computer (PC), a tablet computer, a Smartphone or another mobile end device having a wireless interface, for example a WLAN and/or mobile communications interface, in particular what is known as a battery-operated mobile appliance.

The "client program" may be an application program which is installed on the user computer system. By way of example, the client program may be configured to open and reproduce a pdf document or another document, that is to say for "rendering" of a document.

By way of example, the client program may be configured to exchange data with a server program of the server computer in order to perform a data processing operation. In particular, the client program may implement the functionality of the AusweisApp on the user side in order to enable a secure and trusted readout of attributes of the user from the ID token thereof, by way of example, the personal identity card thereof, wherein, in contrast to the prior art, there is no need for a browser plug-in for this purpose.

In accordance with embodiments of the disclosure a message is transmitted to a server computer system via the Internet browser of the user computer system, wherein the message contains at least one parameter for communication of the client program with the Internet browser.

Here, a "server computer system" is understood in particular to mean a server computer which has an Internet interface. In particular, the server computer system may be an ID provider computer system, that is to say a computer system for the secure and trusted readout of attributes from the ID token and for the signed forwarding of these attributes. Such a server computer system is also referred to as an eID provider, that is to say a computer system capable of providing an electronic identity of the user.

A possibility for communication of the client program with the Internet browser is created by the parameter contained in the message. This communication possibility is advantageous in particular for a response of the client program to the Internet browser once a specific result is present due to the execution of the client program.

The message can be transmitted in that the user calls up a website of the server computer via the Internet browser and inputs there the parameter. This may also be performed automatically by the user computer system, without manual input. Alternatively, the message is formed as a SAML request.

Due to the receipt of the message from the user computer system, the server computer system dynamically generates a uniform resource locator (URL) in accordance with a URL scheme. The URL scheme is configured such that the URL generated by the server computer system can be used to call up the client program. In particular, the URL can be configured in accordance with RFC 3986 of the Network Working Group.

Here, the URL contains the at least one parameter which the server computer system received with the message from the user computer system. The URL is displayed in a browser window of the Internet browser on the user computer system, such that a user can select the URL, for example by clicking on it. Due to the selection of the URL by the user, the client program is started by the operating system of the user computer system, and the at least one parameter contained in the URL is input into the program so as to enable a response of the program to the Internet browser. A result of the execution of the client program is then communicated from the client program to the Internet browser with the aid of this at least one parameter.

Embodiments of the disclosure are particularly advantageous since it is possible to dispense with a plug-in for the Internet browser, specifically since the corresponding functionality is implemented by the client program instead of the browser plug-in.

This has the advantage that there is no need to load a plug-in onto the user computer system via the Internet, which tends to constitute a security risk, particularly because a browser plug-in runs in the same process area as the Internet browser. It is also particularly advantageous that Internet browsers of mobile end devices, in particular Smartphones, can thus be supplemented by additional functions, which was not previously possible since such Internet browser plug-ins are not usually permitted.

Embodiments of the disclosure are particularly advantageous since a very high security of browser-initiated process call-ups is ensured because merely parameters, for example of the operating system of the user computer system, are transferred, and therefore a possibility for manipulation by an attacker is significantly limited.

In an embodiment of the disclosure, one or more of the following parameters are transmitted with the message from the user computer system to the server computer system so that the server computer system can allow these to be incorporated into the dynamic generation of the URL:
  name of the Internet browser,
  a process identifier of the Internet browser in an operating system (105) of the user computer system,
  a response URL to the call-up of the Internet browser by the client program,
  a window identifier of a display window of the Internet browser in the operating system of the user computer system,
  a memory address or a result URL for calling up a result of the execution of the client program by the Internet browser.

In accordance with an embodiment of the disclosure the URL has a predefined static part and a dynamic part. The predefined static part of the URL may contain, for example, the program name of the client program under which said program is registered in the operating system of the user computer system. By contrast, the dynamic part of the URL contains the at least one parameter which the server computer system has received from the user computer system. Further, the dynamic part may contain further parameters which are stored for example in the server computer system.

In accordance with a further embodiment of the disclosure the message is received from the user computer system in the form of a SAML request, by way of example from what is known as a SAML requester (see Security Assertion Markup Language (SAML) V2.0 Technical Overview, OASIS, Committee Draft 02, 25 Mar. 2008). A parameter is recorded, that is to say stored, by the user computer system in the SAML request, and the SAML request is then forwarded to the server computer system. The SAML request can be forwarded in this way due to a manual input of the user or by executing a browser script in the form of an "autosubmit".

In accordance with an embodiment of the disclosure, a server program is started on the server side due to the selection of the URL by the user and is interoperable with the client program. A data processing and/or communication operation, which has a specific result, is performed by execution of the server program and of the client program and also by the accompanying data exchange between the server program and the client program. This result is then communicated to the Internet browser with the aid of the at least one parameter.

In accordance with an embodiment of the disclosure the server computer system has the role of a SAML responder, which generates a SAML answer, that is to say a SAML response, due to the SAML request. The SAML response contains the result of the data processing operation executed by the client program and the server program, and is sent back to the SAML requester via the Internet browser.

In accordance with an embodiment of the disclosure the following processes are performed by the interaction of the client program and the server program: outputting a request to the user for authentication to an ID token which is associated with the user, authenticating the server computer system to the ID token, following successful authentication of the user and of the server computer system to the ID token, allowing read access of the server computer system to at least one attribute stored in the ID token, wherein the read attribute is the result.

In accordance with a further aspect, the disclosure relates to a user computer system comprising an operating system for executing a client program and an Internet browser in separate process areas, wherein the Internet browser is configured to transmit a message to a server computer system, wherein the message contains at least one parameter for communication of the client program with the Internet browser, and wherein the operating system is configured for the client program to be started due to the selection of a URL by a user, and, in so doing, for at least one parameter to be input into the client program, wherein the URL is selected by selecting the URL on a website displayed by the Internet browser, wherein the URL contains the at least one parameter, wherein the client program is configured such that a result of the execution of the client program is communicated from the client program to the Internet browser with the aid of the at least one parameter.

In accordance with an embodiment of the disclosure the user computer system has an interface to an ID token, such as an RFID reader or a chip card reader.

In accordance with the disclosure, an "ID token" is understood in particular to mean a portable electronic device, for example what is known as a USB stick, or a document, in particular a value document or a security document. The ID token has an electronic memory, in which at least one attribute is stored.

In accordance with the disclosure, a "document" is understood in particular to mean paper-based and/or plastic-based documents, for example identification documents, in particular passports, personal identity cards, visas and driver's licences, vehicle certificates, vehicle registration documents, company identification documents, health insurance cards or other ID documents and also chip cards, means of payment, in particular bank notes, bank cards and credit cards, consignment notes or other proofs of authority, into which a data memory for storing at least one attribute is integrated.

In accordance with embodiments of the disclosure the user is the owner of an ID token, for example an electronic identification document, in particular an electronic passport or an electronic identity card.

In a further aspect, the disclosure relates to a server computer system. The server computer system in particular may be an ID provider computer system.

By means of embodiments of the disclosure, a data processing system is created which contains an ID token, a user computer system, a service computer system, that is to say for example a SAML requester, and a server computer system, that is to say for example a SAML responder.

Elements of the following embodiments which correspond to one another or are the same are denoted in each case by like reference signs.

FIG. 1 shows a user computer system 100 comprising an Internet browser 101. The user computer system 100 for example may be a PC or a battery-operated mobile end device, for example a Smartphone, a tablet computer or another mobile computer with wireless communication interface. The Internet browser 101 is preferably configured such that it does not support plug-ins. Alternatively, the Internet browser 101 is configured such that the execution of plug-ins is not allowed.

Instead of a plug-in for the Internet browser 101, a client program 103 is installed on the user computer system 100. The client program 103 may implement a specific function, which is executed on the user computer system 100. For example, this function may be a rendering of data, for example PDF documents, or another application function, for example the secure access to the electronic personal identity card, as was implemented in the prior art by a plug-in, specifically the AusweisApp.

The user computer system 100 has an operating system (OS) 105 comprising what is known as a registry 107, in which the installed programs, that is to say here at least the Internet browser 101 and the client program 103, are registered. By way of example, the program name "Microsoft Internet Explorer" is recorded in the registry 107 for the Internet browser 101, and the program name "PDF Renderer" or "AusweisApp" or "eIDAPP" is recorded for the client program 103. In addition, any instance of the Internet browser 101 executed on the user computer system 100 and of the client program can be assigned a process identifier and/or a window identifier by the operating system 105.

The process identifier of an executed program instance is used here to identify the process area reserved in the user computer system 100 for the relevant instance of one of the programs, that is to say a specific address area which is reserved exclusively for this instance. The window identifier is used to identify a display window or "window", of the relevant instance of one of the programs.

The user computer system 100 further has a memory 109, for example a main memory, that is to say a random access memory (RAM), for storing a result 111 of the execution of the client program 103. This result 111 may be a result of a data processing operation which the client program 103 has executed, for example the "rendering" of a PDF file, that is to say the calculation of image data from the PDF file to be displayed.

Depending on the embodiment, it may be necessary in order to perform a data operation for the client program 103 to interact, that is to say to exchange data, with a server program 113 of a server computer system 136. This is the case in particular if the client program 103 implements the functionality of the AusweisApp. In this case, the result 111 may contain the attributes read out from the electronic personal identity card.

The user computer system 100 is connected to the server computer system 136 via a network 116, for example the Internet. The server computer system 136 has a program 115 for generating a website 117, which can be displayed on the user computer system 100 with the aid of the Internet browser 101. The program 115 implements a URL scheme 119.

The URL scheme 119 may have the following general syntax:

<myURL-Type>://<myFavouriteApp>/<Path><separator><parameters>

The "<myURL-Type>://<myFavouriteApp>/" part of this URL scheme may be a static part here, which identifies a specific predefined client program, wherein myFavouriteApp is the specification of the name of the client program. The "<Path><separator><parameters>" part of the URL by contrast may be generated dynamically by recording there various variable parameters.

If the client program 103 is the eIDApp, the URL schemer 119 may read as follows:

eID://eIDApp/path?param1=aaa&param2=bbb&param3=ccc

The client program 103, that is to say here the eIDApp, is identified by the static part of the URL, that is to say eID://eIDApp/, whereas the subsequent parameters, which are specified in the dynamic part path?param1=aaa&param2=bbb&param3=ccc of the URL may be variable.

The <Path> parameter in a URL denotes an endpoint which the received application can evaluate and on the basis of which a semantic interpretation of the parameter is possible. This parameter is comparable to a method identifier in procedural and object-oriented programming languages. The subsequent parameters then correspond to the arguments of the method. If the client program 103 is the eIDApp, the URL may therefore read as follows:

eID://eIDApp/method1?param1=aaa&param2=bbb&param3=ccc
or
eID://eIDApp/method2?paramA=111&paramB=222

In both cases the eIDApp is called up as the consumer of the URL, but will behave differently.

The server computer system 136 may comprises a memory 140, in which at least some of the parameters 141 of the dynamic part of the URL scheme 119 are stored. By contrast, another part of these parameters 143 can be transmitted from the user computer system 100 to the server computer system 136.

During operation, a user 102 of the user computer system 100 for example calls up the website 117 of the server computer system 136 with the aid of the Internet browser 101. During this call-up process, one or more parameters 143 are transmitted from the user computer system 100 to the server computer system 136 via the Internet browser 101, for example the parameter 1, that is to say param1=aaa. This parameter 143 for example may be an address in the memory 109, to which the result 111 is to be stored. The parameter 143 alternatively or additionally may be one or more of the following parameters:

name of the Internet browser 101,
a process identifier of the Internet browser in the operating system 105 of the user computer system 100,
a response URL to the call-up of the Internet browser 101 by the client program 103, a window identifier of a display window of the Internet browser in the operating system of the user computer system, a memory address or a result URL for calling up a result of the execution of the client program by the Internet browser.

Due to the call-up of the website 117 and the transmission of the parameter 143, the execution of the program 115 is started by the server computer system 136, and therefore this program generates a URL with the aid of the URL scheme 119. This URL contains the static predefined part, which for example may be stored in the memory 140, and the parameter 141, which the program 115 likewise reads out from the memory 140.

This URL 121 generated by the program 115 is inserted into the website 117 by the program 115, such that it is displayed by the Internet browser 101. The user 102 can then select the URL 121, for example by clicking 123 on the URL using his computer mouse. Due to this mouse click, the operating system 105 starts the client program 103 identified by the static part of the URL 121 and additionally transfers the parameters specified in the dynamic part of the URL 121 likewise to this client program 103.

Depending on the embodiment, the server program 113 is additionally started by the server computer system 136 due to the mouse click 123. By way of example, the mouse click is detected for this purpose by the program 115, and a corresponding signal is generated, which thereupon starts the server program 113.

The client program 103 and possibly the server program 113 then perform a data processing operation, for which purpose it may be necessary for the client program 103 and the server program 113 to exchange data, that is to say by way of example commands, cryptographic data and/or user data, via the network 116. The result 111 of this data processing operation is then stored for example in the memory 109 or in another memory, for example of the server computer system 136 which is specified in the URL 121. Once the result 111 is present, the client program 103 sends a signal 125 to the Internet browser 101, for example via the operating system 105, such that the Internet browser can access the result 111 in order to display it in a browser window.

The parameter 143 which identifies the Internet browser 101, by way of example via a process identifier, a window identifier or a URL, which identifies the Internet browser 101 in the user computer system 100, can be used for the transmission of this signal 125. By way of example, a further browser window of the Internet browser 101 can be opened in order to display the result 111.

Figure 2A:
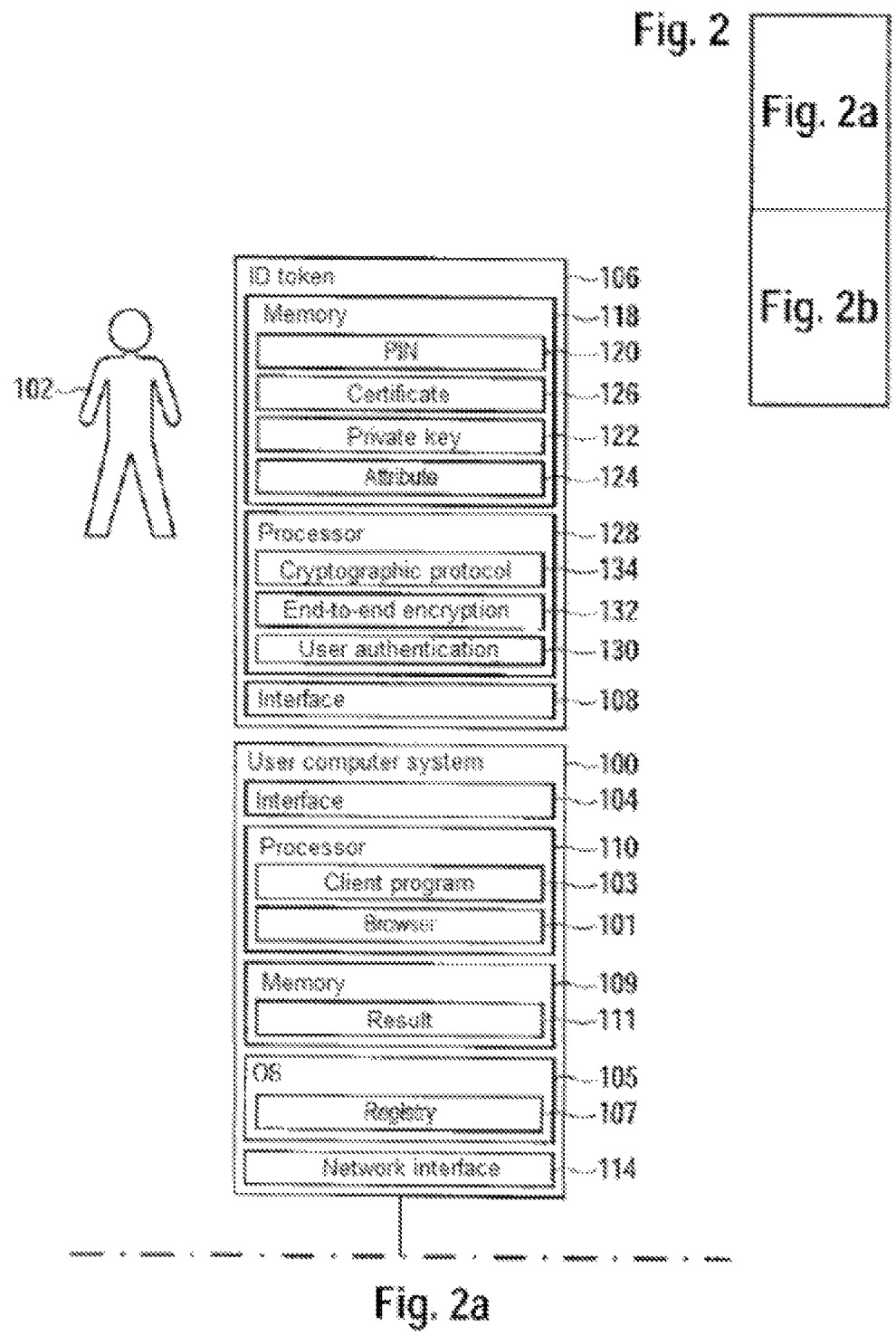
FIG. 2 is made up of FIG. 2a and FIG. 2b and shows a block diagram of a further embodiment of a data processing system according to the disclosure.
Figure 2B:
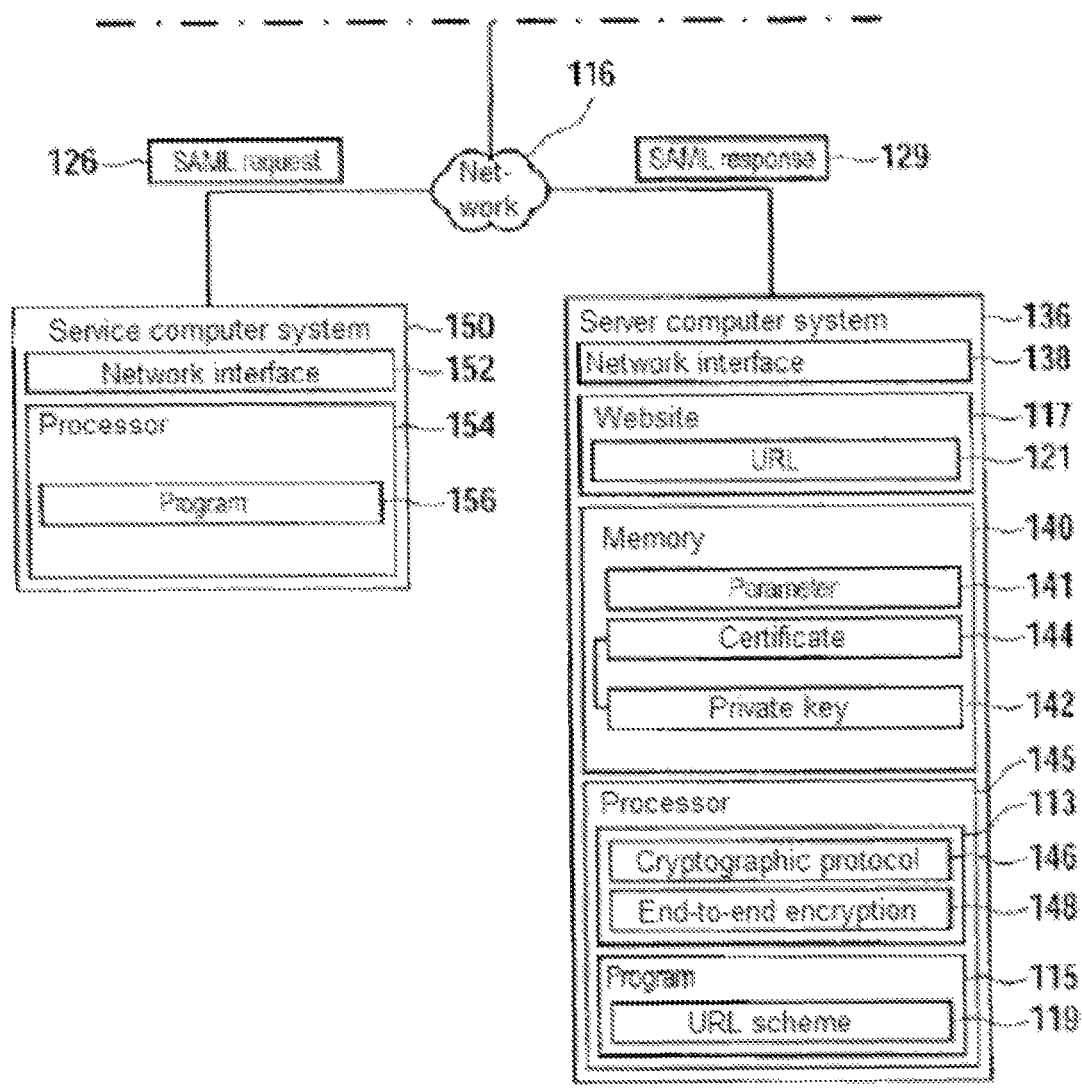

FIG. 2 shows a development of the embodiment according to FIG. 1, wherein the client program 103 is configured here as eIDApp. In this embodiment the user computer system 100 has an interface 104 for communication with an ID token 106, by way of example an electronic personal identity card which has a corresponding interface 108.

The user computer system 100 has at least one processor 110 for executing the client program 103, and one network interface 114 for communication via a network 116. The network may be a computer network, for example the Internet.

The ID token 106 has an electronic memory 118 with protected memory areas 120, 122 and 124. The protected memory area 120 is used to store a reference value which is required for the authentication of the user 102 to the ID token 106. This reference value by way of example is an identification, in particular what is known as a personal identification number (PIN), or is reference data for a biometric feature of the user 102 which can be used for the authentication of the user to the ID token 106.

The protected area 122 is used to store a private key, and the protected memory area 124 is used to store attributes, for example of the user 102, for example the user's name, place of residence, date of birth or sex, and/or attributes concerning the ID token itself, for example the institution that created or issued the ID token, the period of validity of the ID token or an identifier of the ID token, for example a passport number or a credit card number.

The electronic memory 118 may further comprise a memory area 126 for storing a certificate. The certificate contains a public key, which is associated with the private key stored in the protected memory area 122. The certificate may have been created in accordance with a public key infrastructure (PKI) standard, by way of example in accordance with the X.509 standard.

The certificate does not necessarily have to be stored in the electronic memory 118 of the ID token 106. The certificate may alternatively or additionally also be stored in a public directory server.

The ID token 106 has a processor 128. The processor 128 is used for the execution of program instructions 130, 132 and 134. The program instructions 130 are used for user authentication, that is to say for authentication of the user 102 to the ID token.

In an embodiment with PIN, the user 102 inputs his PIN for his authentication into the ID token 106, by way of example via the user computer system 100. By executing the program instructions 130, the protected memory area 120 is then accessed in order to compare the input PIN with the reference value of the PIN stored there. If the input PIN matches the reference value of the PIN, the user 102 is deemed to have been authenticated.

Alternatively, a biometric feature of the user 102 is captured. By way of example, the ID token 106 for this purpose has a fingerprint sensor or is a fingerprint sensor connected to the user computer system 100. The biometric data captured from the user 102 are compared with the biometric reference data stored in the protected memory area 120 in this embodiment by execution of the program instructions 130. With a sufficient match of the biometric data captured form the user 102 with the biometric reference data, the user 102 is deemed to have been authenticated.

The program instructions 134 are used for execution of the process, concerning the ID token 106, of a cryptographic protocol for authentication of a server computer system 136 to the ID token 106. The cryptographic protocol may be a challenge-response protocol based on a symmetric key or an asymmetric key pair.

By way of example, an extended access control method is implemented by the cryptographic protocol, as is specified for machine-readable travel documents (MRTDs) by the international civil aviation organisation (ICAO). By means of successful execution of the cryptographic protocol, the server computer system 136 authenticates itself to the ID token and thus proves its read authorization for reading the attributes stored in the protected memory area 124. The authentication may also be reciprocal, that is to say the ID token 106 must also then authenticate itself to the server computer system 136 in accordance with the same or a different cryptographic protocol.

The program instructions 132 are used for end-to-end encryption of data transmitted between the ID token 106 and the server computer system 136, but at least of the attributes read out by the server computer system 136 from the protected memory area 124. A symmetric key which by way of example is agreed between the ID token 106 and the server computer system 136 on the occasion of the execution of the cryptographic protocol can be used for the end-to-end encryption.

Alternatively to the embodiment illustrated in FIG. 2, the user computer system 100 cannot communicate directly via its interface 104 with the interface 108, but via a reader for the ID token 106, said reader being connected to the interface 104. The PIN may also be input via this reader, for example what is known as a class 2 or class 3 chip card terminal.

The server computer system 136 has a network interface 138 for communication via the network 116. The server computer system 136 further has a memory 140, in which a private key 142 of the server computer system 136 and the corresponding certificate 144 is stored. By way of example, this certificate may also be a certificate in accordance with a PKI standard, for example X.509.

The server computer system 136 further has at least one processor 145 for executing program instructions 146 and 148 of the server program 113. By executing the program instructions 146, the process concerning the server computer system 136 of the cryptographic protocol are executed. On the whole, the cryptographic protocol is thus implemented by execution of the program instructions 134 by the processor 128 of the ID token 106 and by execution of the program instructions 146 by the processor 145 of the server computer system 136.

The program instructions 148 are used for implementation of the end-to-end encryption by the server computer system 136, by way of example based on the symmetric key which has been agreed between the ID token 106 and the server computer system 136 on the occasion of the execution of the cryptographic protocol. In principle, any method already known per se for agreeing the symmetric key can be used for the end-to-end encryption, for example a Diffie-Hellman key exchange.

The server computer system 136 is preferably located in a particularly protected environment, in particular in what is known as a trust centre, such that the server computer system 136, in combination with the need for authentication of the user 102 to the ID token 106, forms the confidence anchor for the authenticity of the attributes read out from the ID token 106.

A service computer system 150 can be configured to accept an order or a commission for a service or a product, in particular an online service. By way of example, the user 102 can open a bank account online via the network 116 via the Internet browser 101 or can use another financial or banking service. The service computer system 150 may also be configured as an online warehouse, such that the user 102 can purchase a mobile telephone or the like online by way of example. Further, the service computer system 150 may also be configured to deliver digital content, by way of example for the download of music data and/or video data.

To this end, the service computer system 150 has a network interface 152 for connection to the network 116. Further, the service computer system 150 has at least one processor 154 for executing program instructions 156. By way of example, execution of the program instructions 156 generates dynamic HTML pages, which the user 102 can use to input his commission or his order.

Depending on the nature of the product or the service commissioned or ordered, the service computer system 150 must check one or more attributes of the user 102 and/or ID token 106 thereof on the basis of one or more predefined criteria. Only once this check has been completed is the commission or the order of the user 102 accepted and/or executed.

By way of example, it is necessary for the opening of a bank account or the purchase of a mobile telephone with an associated contract for the user 102 to disclose his identity to the service computer system 150 and for this identity to be checked. In the prior art, the user 102 must present his personal identity card by way of example for this purpose. This procedure is replaced by the readout of the digital identity of the user 102 from his ID token 106.

Depending on the application, the user 102 does not however have to disclose his identity to the service computer system 150, and instead the communication for example of just one of the attributes is sufficient. By way of example, the user 102 can use one of the attributes to provide evidence that he belongs to a particular group of people which is authorised to access data held on the service computer system 150 for download. By way of example, such a criterion may be a minimum user of the user 102 or the affiliation of the user 102 to a group of people which has access authorization for particular confidential data.

For utilisation of the service provided by the service computer system 150, the following approach is adopted in principle by way of example:

1. Authenticating the user 102 to the ID token 106.

The user 102 authenticates himself to the ID token 106. In an implementation with PIN, the user 102 for this purpose inputs his PIN, by way of example via the user computer system 100 or a chip card terminal connected thereto, once the user 102 has been requested to do so by the client program 103. By executing the program instructions 130, the ID token 106 then checks the correctness of the input PIN. If the input PIN matches the reference value of the PIN stored in the protected memory area 120, the user 102 is thus deemed to have been authenticated. The procedure may be similar if a biometric feature of the user 102 is used to authenticate him, as described above.

2. Authenticating the server computer system 136 to the ID token 106.

To this end, a connection is produced to the ID token 106 and the server computer system 136 via the user computer system 100 and the network 116. By way of example, the server computer system 136 transmits its certificate 144 via this connection to the ID token 106. The program instructions 134 then generate what is known as a challenge, that is to say a random number, by way of example. This random number is encrypted using the public key of the server computer system 136, said key being contained in the certificate 144. The resulting cipher is sent from the ID token 106 via the connection to the server computer system 136. The server computer system 136 decrypts the cipher using its private key 142 and in this way obtains the random number. The random number is returned by the server computer system 136 to the ID token 106 via the connection. By executing the program instructions 134, it is checked there whether the random number received from the server computer system 136 matches the originally generated random number, that is to say the challenge. If this is the case, the server computer system 136 is deemed to have been authenticated to the ID token 106. The random number can be used as a symmetric key for the end-to-end encryption.

3. When the user 102 has successfully authenticated himself to the ID token 106, and when the server computer system 136 has successfully authenticated itself to the ID token 106, the server computer system 136 is provided with read authorization for the readout of one or more or all of the attributes stored in the protected memory area 124. The requested attributes are read out from the protected memory area 124 due to a corresponding read command, which the server computer system 136 sends to the ID token 106 via the connection, and said attributes are encrypted by execution of the program instructions 132. The encrypted attributes are transmitted via the connection to the server computer system 136, where they are decrypted by execution of the program instructions 148. The server computer system 136 is thus aware of the attributes read out from the ID token 106.

These attributes are signed by the server computer system with the aid of its certificate 144 and are transmitted via the user computer system 100 to the service computer system 150. Before the attributes are forwarded from the user computer system, they are displayed for example by the Internet browser 101 so that the user 102 can confirm them.

The service computer system 150 is thus made aware of the attributes read out from the ID token 106, and therefore the service computer system 150 can check these attributes on the basis of the predefined one or more criteria so as to then provide the service requested by the user 102 where appropriate.

The need to authenticate the user 102 to the ID token 106 and to authenticate the server computer system 136 to the ID token 106 provides the necessary confidence anchor, so that the service computer system 150 can be certain that the attributes of the user 102 which have been communicated to it by the server computer system 136 are correct and not falsified.

Depending on the embodiment, the order of authentication may be different. By way of example, provision may be made for the user 102 to have to authenticate himself to the ID token 106 first of all, followed by the server computer system 136. In principle, however, it is also possible for the server computer system 136 to have to authenticate itself to the ID token 106 first of all, followed only then by the user 102.

In the first case, the ID token 106 is configured, by way of example, such that it is unlocked only through input of a correct PIN or a correct biometric feature by the user 102. Only this unlocking allows the program instructions 132 and 134 to start and hence the server computer system 136 to be authenticated.

In the second case, it is also possible to start the program instructions 132 and 134 even when the user 102 has not authenticated himself to the ID token 106. In this case, by way of example, the program instructions 134 are configured such that the server computer system 136 cannot execute a read access to the protected memory area 124 for the readout of one or more of the attributes until after the program instructions 130 have signalled that the user 102 has also been successfully authenticated.

Of particular advantage is the utilisation of the ID token 106 for e-commerce and e-government applications, for example, more specifically without media disruption and in accordance with legal provisions due to the confidence anchor formed as a result of the need for authentication of the user 102 and of the server computer system 136 to the ID token 106. It is further particularly advantageous that a central storage of the attributes of various users 102 is not necessary, and therefore the data protection problems existing in the prior art are solved hereby. With regard to the convenience of the application of the method, it is particularly advantageous that a prior registration of the user 102 for utilisation of the server computer system 136 is not necessary.

The data processing system shown in FIG. 2 is preferably implemented with the aid of the security assertion markup language (SAML). In this case, the service computer system 150 has the role of a SAML requester, and the server computer system 136 plays the role of a SAML responder. In the application considered here of the readout of attributes from the ID token 106, the service computer system 150 is an attribute requester and the server computer system 136 is an attribute authority, which produces a SAML assertion with the read-out attributes.

Due to the above-described selection of a service or a product on the website of the service computer system by the user 102, the service computer system 150 generates a SAML request 126, which the service computer system 150 sends to the Internet browser 101 of the user computer system 100. The SAML request 126 contains an attribute specification of those attributes of the ID token 106 of which the service computer system 150 is aware in order to provide the requested service or in order to accept the order for the product desired by the user 102.

The SAML request 126 is forwarded to the server computer system 136 with the aid of the Internet browser 101 via the network 116. This can also be achieved by a manual interaction of the user 102 with the Internet browser 101 or automatically by what is known as an autosubmit, that is to say the execution of a corresponding script by the Internet browser 101. Before the SAML request 126 is forwarded, the parameters 143 are incorporated into the SAML request 126 by the user computer system 100, said parameters for example being the browser type or browser name of the Internet browser 101 and/or the process identifier of the process area of the Internet browser 101 which has been assigned to the Internet browser 101 by the operating system 105.

The program 115 is started due to the receipt of the SAML request 126 by the server computer system 136. The program 115 then uses the URL scheme 119 to generate the URL 121 (in this regard see the embodiment according to FIG. 1). The URL 121 is then displayed on the Internet browser 101 via the website 117, such that the user 102 can select the URL 121, for example by means of a mouse click 123. The client program 103 is then started as well as the server program 113 on account of this mouse click.

By way of example, the client program 113 may include the following functionalities: The client program 103 generates a display window, in which the attributes specified in the SAML request 126 are indicated. The user than has the possibility of confirming these requested attributes or of refusing the readout of these attributes. Following confirmation of the attribute specification by the user 102, that is to say the permission for the execution of the SAML request 126, the client program 103 generates a request for the user 102 for his authentication to the ID token 106 and sends a corresponding command to the ID token 106 via the interface 104. Once the user 102 has been successfully authenticated to the ID token 106, this is signalled by the client program 103 to the server program 113. The server program 113 then authenticates itself to the ID token 106 and reads out the attributes specified in the SAML request 126 from ID token 106, once this authentication as described above has been performed. The server program 113 then generates, as a response to the SAML request 126, a SAML response 129 which contains the attributes read out from the ID token 106. The SAML response 129 is then sent from the server program 113 to the client program 103. It is then signalled to the client program 103 that the SAML response 129 is being stored temporarily as a result 111 in the memory 109. The client program 103 further signals to the Internet browser 101 via the signal 125 (see FIG. 1) that the result 111, that is to say here the SAML response 129, is present. The Internet browser 101 then forwards the SAML response 129 to the service computer system 150, such that the service computer system receives the necessary attributes.

Figure 3:
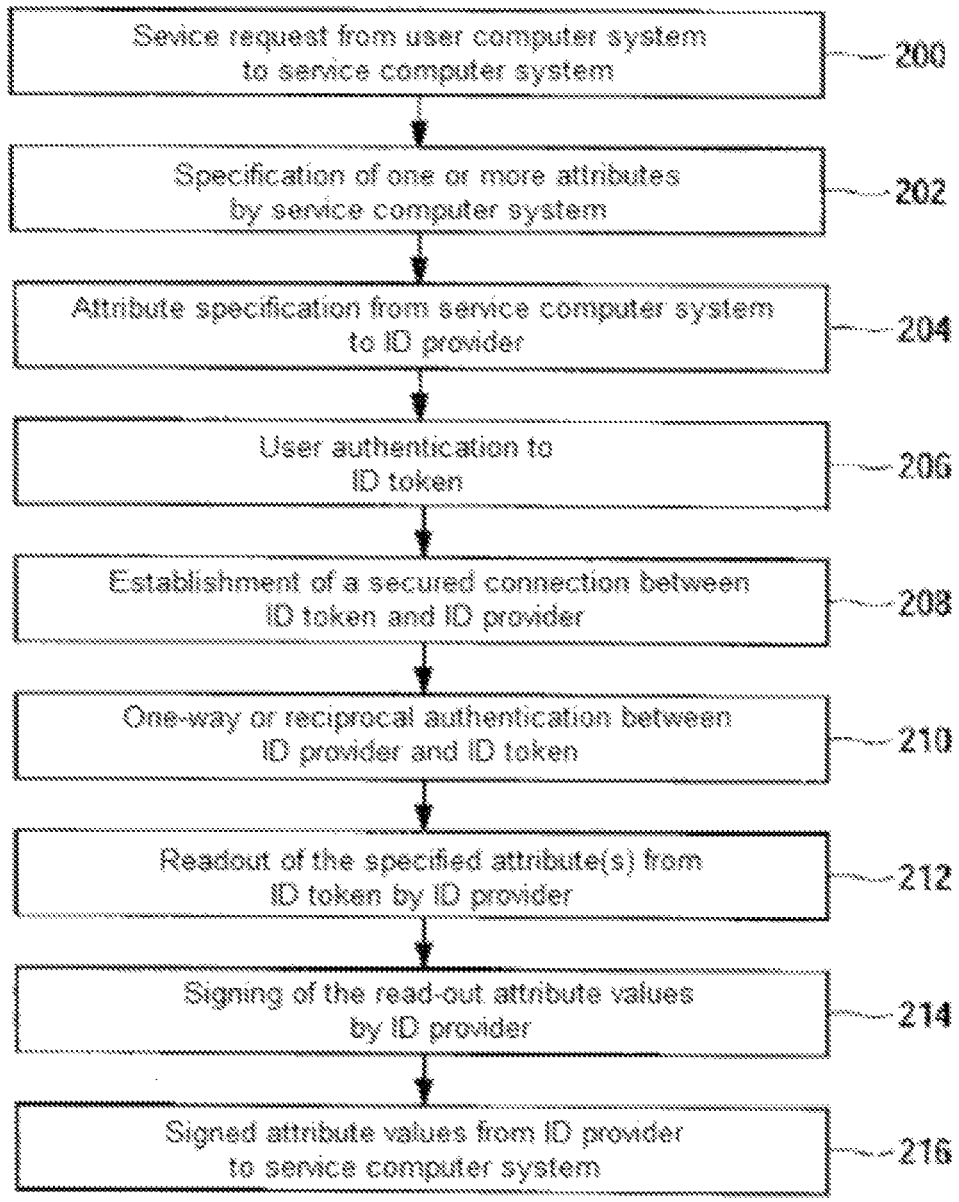
FIG. 3 shows a flow diagram of an embodiment of a method according to the disclosure.

FIG. 3 shows an embodiment of a method according to the disclosure. In process 200 a service request is sent from the user computer system to the service computer system. By way of example, the user starts an Internet browser of the user computer system for this purpose and inputs a URL to call up a website of the service computer system. The user then inputs his service request into the called-up website, for example to commission or place an order for a service or a product.

In process 202 the service computer system 150 then specifies one or more attributes which it requires in order to check the authorization of the user for the service request and generates a SAML request, which contains this attribute specification. In particular, the service computer system can specify such attributes which determine the digital identity of the user 102. This specification of the attributes by the service computer system 150 can be predefined in a fixed manner or, depending on the service request, can be determined in each individual case by the service computer system 150 on the basis of predefined rules.

In process 204 the SAML request is transmitted from the service computer system to the server computer system, more specifically via the user computer system. The parameters 143 (see FIG. 1) are supplemented in the SAML request by the user computer system before being forwarded.

The server computer system then generates the URL 121 and outputs this via the website 117, such that the URL 121 is displayed by the Internet browser 101. The user can then select the URL 121, for example by means of a mouse click, such that the client program 121 and the server program 113 are then started.

In order to give the server computer system the possibility to read out attributes from its ID token, the user authenticates himself to the ID token in process 206.

In process 208 a connection is established between the ID token and the server computer system; this can be implemented by the client program 103, which forwards the data from the ID token to the server computer system and vice versa. This connection is preferably a secured connection, for example in accordance with what is known as a secure messaging method.

In process 210 the server computer system is at least authenticated to the ID token via the connection established in process 208. In addition, the ID token may also be authenticated to the server computer system.

Once both the user and the server computer system have been successfully authenticated to the ID token, the server computer system receives the access authorization from the ID token for the readout of the attributes. In process 212 the server computer system sends one or more read commands for the readout of the attributes from the ID token necessary in accordance with the attribute specification. The attributes are then transmitted by means of end-to-end encryption via the secured connection to the server computer system, where they are decrypted.

The read-out attribute values are signed in process 214 by the server computer system, and the server computer system generates the SAML response. In process 216 the server computer system sends the SAML response with the signed attribute values via the network. The signed attribute values reach the service computer system via the user computer system. The user may have the possibility to take note of the signed attribute values and/or to supplement these with further data.

LIST OF REFERENCE SIGNS 100 user computer system
101 Internet browser
102 user
103 client program
104 interface
105 operating system
106 ID token
107 registry
108 interface
109 memory
110 processor
111 result
103 program instructions
113 server program
114 network interface
115 program
116 network
117 website
118 electronic memory
119 URL scheme
120 protected memory area
122 protected memory area
123 mouse click
124 protected memory area
125 signal
126 SAML request
128 processor
129 SAML response
130 program instructions
132 program instructions
134 program instructions
136 server computer system
138 network interface
140 memory
141 parameter
142 private key
143 parameter
144 certificate
145 processor
146 program instructions
148 program instructions
149 program instructions
150 service computer system
152 network interface
154 processor
156 programme instructions

What is claimed is:

1. A method for starting a client program via an Internet browser of a user computer system, comprising:
  transmitting a message via the Internet browser to a server computer system, wherein the message contains at least one parameter for communication of the client program with the Internet browser;
  dynamically generating a uniform resource locator (URL) by the server computer system, wherein the URL is configured to start the client program in accordance with a URL scheme, wherein the URL contains the at least one parameter;
  transmitting a website having the URL from the server computer system to the user computer system and displaying the website having the URL in a browser window of the Internet browser for selection by a user;
  responsive to selection of the dynamically generated URL by the user, starting the client program on the user computer system and inputting the at least one parameter into the client program; and communicating a result of the execution of the client program from the client program to the Internet browser with the aid of the parameter.

2. The method according to claim 1, wherein the URL contains one or more of the following parameters:
   name of the Internet browser;
   a process identifier of the Internet browser in an operating system of the user computer system;
   a response URL for calling up the Internet browser by the client program;
   a window identifier of a display window of the Internet browser in the operating system of the user computer system; and
   a memory address or a result URL for calling up a result of the execution of the client program by the Internet browser.

3. The method according to claim 1, wherein the client program is registered in the operating system of the user computer system under a program name, and wherein the URL comprises a static part, which contains the program name, and a dynamic part, which contains the at least one parameter.

4. The method according to claim 1, wherein the message is configured as a Security Assertion Markup Language (SAML) request, wherein the SAML request is received from the user computer system and the at least one parameter is incorporated into the SAML request from the user computer system, the SAML request being forwarded by the Internet browser to the server computer system in accordance with said parameter.

5. The method according to claim 1, wherein a server program, which is interoperable with the client program, is started due to the selection of the URL on the server computer system, wherein the client program and the server program interact in order to obtain the result, which is communicated to the Internet browser.

6. The method according to claim 4, wherein a Security Assertion Markup Language (SAML) response is generated by the server computer system and contains the result, wherein the SAML response is sent from the server computer system via the Internet browser of the user computer system to a service computer system which has sent the SAML request.

7. The method according to claim 6, wherein one or more of the following further parameters are stored by the server computer system:
   an address of the server program, in particular a URL for calling up the server program;
   a session identifier of the session established between the Internet browser and the server computer system for transmission of the message;
   an identifier for a security protocol for secure communication with the Internet browser;
   security parameter for the security protocol; and
   a symmetric key for the encrypted communication with the server computer system, wherein the URL generated dynamically by the server computer system contains one or more of these further parameters.

8. The method according to claim 7, wherein the following are performed by the interaction of the client program and server program:
   outputting a request to the user for authentication to an ID token associated with the user;
   authenticating the server computer system to the ID token; and
   following successful authentication of the user and of the server computer system to the ID token, granting read access of the server computer system to at least one attribute stored in the ID token, wherein the read attribute is the result.

9. The method according to claim 8, wherein the SAML response contains the at least one attribute.

10. The method according to claim 8, wherein a connection with end-to-end encryption is established between the ID token and the server program via the user computer system, the read access occurring via said connection.

11. The method according to claim 2, wherein the client program is registered in the operating system of the user computer system under a program name, and wherein the URL comprises a static part, which contains the program name, and a dynamic part, which contains the at least one parameter.

12. The method according to claim 2, wherein the message is configured as a Security Assertion Markup Language (SAML) request, wherein the SAML request is received from the user computer system and the at least one parameter is incorporated into the SAML request from the user computer system, the SAML request being forwarded by the Internet browser to the server computer system in accordance with said parameter.

13. The method according to claim 3, wherein the message is configured as a Security Assertion Markup Language (SAML) request, wherein the SAML request is received from the user computer system and the at least one parameter is incorporated into the SAML request from the user computer system, the SAML request being forwarded by the Internet browser to the server computer system in accordance with said parameter.

14. The method according to claim 2, wherein a server program, which is interoperable with the client program, is started due to the selection of the URL on the server computer system, wherein the client program and the server program interact in order to obtain the result, which is communicated to the Internet browser.

15. The method according to claim 3, wherein a server program, which is interoperable with the client program, is started due to the selection of the URL on the server computer system, wherein the client program and the server program interact in order to obtain the result, which is communicated to the Internet browser.

16. The method according to claim 4, wherein a server program, which is interoperable with the client program, is started due to the selection of the URL on the server computer system, wherein the client program and the server program interact in order to obtain the result, which is communicated to the Internet browser.

17. The method according to claim 5, wherein one or more of the following further parameters are stored by the server computer system:
   an address of the server program, in particular a URL for calling up the server program;
   a session identifier of the session established between the Internet browser and the server computer system for transmission of the message;
   an identifier for a security protocol for secure communication with the Internet browser;
   security parameter for the security protocol; and
   a symmetric key for the encrypted communication with the server computer system, wherein the URL generated dynamically by the server computer system contains one or more of these further parameters.

18. The method according to claim 5, wherein the following are performed by the interaction of the client program and server program:
- outputting a request to the user for authentication to an ID token associated with the user;
- authenticating the server computer system to the ID token; and
- following successful authentication of the user and of the server computer system to the ID token, granting read access of the server computer system to at least one attribute stored in the ID token, wherein the read attribute is the result.

19. The method according to claim 6, wherein the following are performed by the interaction of the client program and server program:
- outputting a request to the user for authentication to an ID token associated with the user;
- authenticating the server computer system to the ID token; and
- following successful authentication of the user and of the server computer system to the ID token, granting read access of the server computer system to at least one attribute stored in the ID token, wherein the read attribute is the result.

20. The method according to claim 6, wherein the SAML response contains the at least one attribute.

21. The method according to claim 7, wherein the SAML response contains the at least one attribute.

22. The method according to claim 9, wherein a connection with end-to-end encryption is established between the ID token and the server program via the user computer system, the read access occurring via said connection.

23. A non-transitory computer-readable medium having computer-executable instructions that, when executed by a processor, cause the processor to perform a method for starting a client program via an Internet browser of a user computer system, the method comprising:
- transmitting a message via the Internet browser to a server computer system, wherein the message contains at least one parameter for communication of the client program with the Internet browser;
- dynamically generating a uniform resource locator (URL) by the server computer system, wherein the URL is configured to start the client program in accordance with a URL scheme, wherein the URL contains the at least one parameter;
- transmitting a website having the URL from the server computer system to the user computer system and displaying the website having the URL in a browser window of the Internet browser for selection by a user;
- responsive to selection of the dynamically generated URL by the user, starting the client program on the user computer system and inputting the at least one parameter into the client program; and
- communicating a result of the execution of the client program from the client program to the Internet browser with the aid of the parameter.

24. A user computer system comprising an operating system and having a hardware processor for executing a client program and an Internet browser in separate process areas, wherein the Internet browser is configured for the transmission of a message to a server computer system, wherein the message contains at least one parameter for the communication of the client program with the Internet browser, and wherein the operating system of the user computer system is adapted such that the client program is started by the hardware processor due to the selection of a uniform resource locator (URL) by a user, and, during this process, at least one parameter is input into the client program, wherein the URL is selected by selection of the URL on a website displayed by the Internet browser, wherein the URL contains the at least one parameter, wherein the client program is configured such that a result of the execution of the client program with the aid of the at least one parameter is communicated from the client program to the Internet browser by the hardware processor of the user computer system.

25. The user computer system according to claim 24, wherein the Internet browser is configured to receive the message and to forward the message in the form of a Security Assertion Markup Language (SAML) request.

26. The user computer system according to claim 24, comprising an interface for communication with an ID token, wherein a connection with end-to-end encryption to the ID token can be established via the user interface in order to enable a readout of at least one attribute from the ID token, wherein the Internet browser is configured to forward a Security Assertion Markup Language (SAML) response containing the at least one attribute.

27. The user computer system according to claim 25, comprising an interface for communication with an ID token, wherein a connection with end-to-end encryption to the ID token can be established via the user interface in order to enable a readout of at least one attribute from the ID token, wherein the Internet browser is configured to forward a Security Assertion Markup Language (SAML) response containing the at least one attribute.

28. A server computer system comprising:
- a hardware network interface configured to receive a message from the Internet browser of a user computer system, wherein the message contains at least one parameter for communication of a client program with the Internet browser;
- a hardware processor configured to dynamically generate a uniform resource locator (URL) by the server computer system, wherein the URL is configured to call up the client program in accordance with a URL scheme and the URL contains the at least one parameter, and for generating a website having the URL; and
- the hardware network interface configured to transmit the website from the server computer system to the user computer system for selection of the URL by a user.

29. The server computer system according to claim 28, comprising a server program which is interoperable with the client program, wherein the server program can be is started due to the selection of the URL by the user.

30. A method performed by a server computer system, comprising:
- receiving a message from the Internet browser of a user computer system, wherein the message contains at least one parameter for communication of a client program with the Internet browser;
- dynamically generating a uniform resource locator (URL), wherein the URL is configured to start the client program in accordance with a URL scheme and the URL contains the at least one parameter, and for generating a website having the URL; and
- transmitting the website from the server computer system to the user computer system for selection of the URL by a user.

* * * * *